United States Patent [19]

Tsubokura et al.

[11] Patent Number: 5,231,142

[45] Date of Patent: Jul. 27, 1993

[54] RUBBER-MODIFIED STYRENE-BASED RESIN COMPOSITION

[75] Inventors: Yutaka Tsubokura; Yoshiyuki Suetsugu; Shinichi Nakamura; Eiichi Terada, all of Ichihara, Japan

[73] Assignee: Idemitsu Petrochemical Co., Ltd., Tokyo, Japan

[21] Appl. No.: 465,199

[22] PCT Filed: Jul. 28, 1989

[86] PCT No.: PCT/JP89/00781

§ 371 Date: Feb. 28, 1990

§ 102(e) Date: Feb. 28, 1990

[87] PCT Pub. No.: WO90/01047

PCT Pub. Date: Aug. 2, 1990

[30] Foreign Application Priority Data

Jul. 28, 1988 [JP] Japan .................. 63-186781
Jun. 26, 1989 [JP] Japan .................. 64-160661

[51] Int. Cl.$^5$ .................. C08F 279/02; C08F 287/00
[52] U.S. Cl. .................. 525/316; 525/93; 525/185; 525/263; 525/314; 524/560; 524/574; 524/575.5; 524/577
[58] Field of Search .................. 525/263, 314, 316

[56] References Cited

U.S. PATENT DOCUMENTS

4,493,922 1/1985 Echte et al. .................. 525/314
4,972,024 11/1990 Iwamoto et al. .................. 525/314

FOREIGN PATENT DOCUMENTS

72808 1/1983 Australia .
3345377 6/1985 Fed. Rep. of Germany .
55-56114 4/1980 Japan .
60-118734 6/1985 Japan .
60-130614 7/1985 Japan .
60-233118 11/1985 Japan .

OTHER PUBLICATIONS

Echte, Adolph, "Teilchenbildung bei der Herstellung von kautschukmodifiziertem Polystyrol", 1977, pp. 175–198, Die Angewandte Makromolekulare Chemie, 58/59.

Wagner et al., Journal Of Applied Polymer Science, "Ultrasonic Degradatin of the Gel Phase in Impact Polystyrenes", vol. 15, pp. 3043-3051 (1971), U.S.A.

J. Moore, Polymer, "An electron microscope study of the microstructure of some rubber–reinforced polystyrenes", vol. 12, No. 8, pp. 478–486, Aug. 1971, U.K.

H. Keskkula, Applied Polymer Symposium, "Rubber Modified Styrene Polymers", No. 15, 51–78 (1970), U.S.A.

Journal Of Applied Polymer Science, "The Observation of Crazes in High–Impact Polystyrene by Electron Microscopy", vol. 14, pp. 852–859, (1970).

Encyclopedia of Polymer Science and Technology, "Plastics, Resins, Rubbers, Fibers", vol. 13, pp. 215–223, (1970), John Wiley & Sons, U.S.A.

Database Chemical Abstracts (HOST:STN), vol. 103, No. 26, 1985, abstract No. 215971y, Columbus, OH, US: & JP-A-60 130 614 (Asahi Chemical Ind.).

Primary Examiner—Melvyn I. Marquis
Assistant Examiner—Vasu S. Jagannathan
Attorney, Agent, or Firm—Frishauf, Holtz, Goodman & Woodward

[57] ABSTRACT

A rubber-modified styrene-based resin composition comprising (A) 70 to 92% by weight of a styrene-based polymer and 30 to 8% by weight of a rubbery polymer wherein the rubbery polymer is dispersed in the styrene-based polymer in the form of particles having an occlusion structure with a plane of symmetry, an area average particle diameter of 0.1 to 0.7 μm, and a ratio of area average particle diameter to number average particle diameter of 1.0 to 2.5, the weight ratio of gel content to rubbery polymer is 1.1:1 to 4.0:1, and the swelling index is 5 to 20. The styrene-based resin composition has excellent physical properties and can be used as a material for office automation equipment, home electric appliances, sheets and so on.

11 Claims, No Drawings

RUBBER-MODIFIED STYRENE-BASED RESIN COMPOSITION

TECHNICAL FIELD

The present invention relates to a novel rubber-modified styrene-based resin composition. More particularly, it is concerned with a rubber-modified styrene-based resin composition which has a high impact strength and further has excellent gloss and stiffness; in other words, is well balanced in physical properties, and thus which is suitable as a material for production of e.g., Office Automation (OA) equipment, home electric appliances or sheets.

BACKGROUND ART

Heretofore, for the purpose of improving impact resistance of a styrene-based resin, polystyrene has been blended with a rubber-like polymer or styrene has been polymerized in the presence of a rubber-like polymer on a commercial scale to produce a so-called rubber-modified polystyrene resin composition in which styrene is partially graft polymerized to the rubber-like polymer and the remainder of styrene is converted into polystyrene and thus which is in the state that a graft copolymer of the rubber-like polymer/styrene and polystyrene are blended.

It is known that in the above rubber-modified polystyrene resin composition, the rubber-like polymer is usually dispersed in the styrene-based polymer in a spherical form, and the size of particle has an intimate relation with impact resistance, stiffness and gloss. That is, as the size of rubber-like polymer particle is smaller, stiffness and gloss are better. To the contrary, as the size of polymer particle is smaller, impact resistance is more decreased, and below a certain limit, an effect of improving impact resistance is lost.

In the conventional rubber-modified polystyrene resin composition, to obtain the desired impact resistance, a rubber-like polymer is dispersed in a polystyrene resin in the form of particles having a particle diameter of at least 1 $\mu$m, usually in the range of 1 to 10 $\mu$m. The conventional rubber-modified polystyrene resin, however, has a problem of being limited in use because it is poor in gloss and stiffness.

It is known that in high impact resistant polystyrene (HIPS), rubber-like polymer particles dispersed have occlusion structure (Die Angevandte Makromolekulare Chemie, Vol. 58/59, pp. 175–198 (1977). However, no detailed investigation has been made on the micro structure of dispersed particles. As such a styrene-based resin composition in which rubber-like polymer particles dispersed have the occlusion structure, a composition in which a styrene-butadiene block copolymer is dispersed in polystyrene in the form of particles having a particle diameter of 0.1 to 0.6 $\mu$m and having the occlusion structure that more than 80% of the particles do not have a plane of symmetry has been proposed (West German Patent Laid-Open No. 3,345,377). This composition, however, is not sufficiently high in impact resistance.

The present invention is intended to overcome the defects of the conventional rubber-modified styrene-based resin composition and an object of the present invention is to provide a styrene-based resin composition which has a high impact resistance and further excellent gloss and stiffness, and which is well balanced in physical properties.

As a result of investigations to develop a styrene-based resin composition which is excellent in physical property balance such as impact resistance, gloss and stiffness, it has been found that a composition which contains a styrene-based polymer and a rubber-like polymer in a specified ratio, and in which the rubber-like polymer is dispersed in the styrene-based polymer in the form of particles having a occlusion structure having a plane of symmetry, a specified particle diameter and a specified particle diameter distribution, and a gel content and a swelling index are in specified ranges is suitable for the above object. Moreover the present inventors have discovered that the above composition exhibits particularly excellent physical properties when the thickness of the rubber-like polymer layer, the area average particle diameter of the rubber-like polymer and the volume fraction of the rubber-like polymer satisfy a specified relation. Based on the findings, the present invention has been accomplished.

DISCLOSURE OF INVENTION

That is, the present invention provides a rubber-modified styrene-based resin composition comprising (A) 70 to 92% by weight of a styrene-based polymer and (B) 30 to 8% by weight of a rubber-like polymer, said rubber-like polymer being dispersed in the styrene-based polymer as particles having an occlusion structure with a plane of symmetry, having an area average particle diameter of 0.1 to 0.7 $\mu$m, and having a ratio of area average particle diameter to number average particle diameter of 1.0 to 2.5, the gel content of the composition being such that the weight ratio of gel content to rubber-like polymer is 1.1:1 to 4.0:1, and the swelling index of the composition being 5 to 20.

The rubber-modified styrene-based resin composition of the present invention has a feature of being excellent in physical property balance, for example, having a high impact strength and moreover excellent gloss and stiffness, because the rubber-like polymer is dispersed in the styrene-based polymer as particles having an occlusion structure with a plane of symmetry, a specified particle diameter and a specified particle diameter distribution, and moreover has a specified micro structure.

Furthermore, when the thickness of the rubber-like polymer phase, the diameter of the rubber-like polymer particle, in other words, the area average particle diameter of the rubber-like polymer and the volume fraction of the rubber-like polymer have a specified relation, the composition has more excellent physical properties and moreover a good falling weight strength.

BEST MODE FOR CARRYING OUT THE INVENTION

The styrene-based polymer as the composition (A) in the composition of the present invention may be a styrene homopolymer or a copolymer of styrene and a monomer copolymerizable therewith. As such copolymerizable monomers, aromatic monovinyl compounds such as $\alpha$-methylstyrene, vinyltoluene, vinylethylbenzene, vinylxylene, p-tertbutylstyrene, $\alpha$-methyl-p-methylstyrene and vinylnaphthalene, acrylonitrile, methyl methacrylate, methyl acrylate, methacrylic acid, acrylic acid, maleic anhydride, phenylmaleimide and the like can be used. These monomers can be used alone or as mixtures comprising two or more thereof. The copolymerizable monomer is used in a proportion of usually not more than 50% by weight, preferably not more than 40% by weight based on the total weight of all monomers including styrene.

The type of the rubber-like polymer as the component (B) is not critical. Those conventionally used in the usual rubber-modified styrene-based resin compositions, such as natural rubber, synthetic rubbers, e.g., polybutadiene rubber, polyisoprene rubber, styrene-butadiene copolymer rubber, styreneisoprene copolymer rubber, butyl rubber, and ethylene-propylene based copolymer rubber, or graft copolymer rubbers of these rubbers and styrene can be used. Of these, styrene-butadiene copolymer rubber, or a combination of styrene-butadiene copolymer rubber and polybutadiene rubber is preferred. When styrene-butadiene copolymer rubber and polybutadiene rubber are used in combination, the ratio of the former/the latter = 10/0 to 6/4 (weight ratio).

As this styrene-butadiene block copolymer rubber, a rubber having a molecular weight in the range of 50,000 to 500,000 and a polymer block content, said polymer block being formed of styrenes, in the range of 10 to 60% by weight is particularly preferred. If the molecular weight is less than 50,000, impact resistance is not sufficiently high, and if it is more than 500,000, fluidity at the time of molding is undesirably decreased. If the content of polymer block formed of styrenes is less than 10% by weight, gloss is poor, and if it is more than 60% by weight, impact resistance tends to be decreased.

As this styrene-butadiene block copolymer, the mixture of this styrene-butadiene block polymer and polybutadiene rubber having a molecular weight of about 50,000 to 1,000,000 may be used.

The molecular weight of the rubber-like polymer is a weight average molecular weight (calculated as polystyrene) as determined by Gel Permeation Chromatogram (G.P.C).

In the styrene-based resin composition of the present invention, it is necessary for the rubber-like polymer as the component (B) to be dispersed in the styrene-based polymer as the component (A) as particles which have an occlusion structure with a plane of symmetry and in which the area average particle diameter is 0.1 to 0.7 μm and preferably 0.2 to 0.6 μm and the ratio of area average particle diameter to number average particle diameter is 1.0 to 2.5 and preferably 1.0 to 1.8.

If the area average particle diameter is less than 0.1 μm, impact resistance is not sufficiently high, and if it is more than 0.7 μm, gloss tends to be decreased. If the area average particle diameter to the number average particle diameter is more than 2.5, there is a tendency of gloss being decreased.

It is necessary for dispersed particles of the rubber-like polymer to have an occlusion structure with a plane of symmetry.

If the dispersed particles of the rubber-like polymer have an occlusion structure not having a plane of symmetry, impact resistance is poor.

The occlusion structure with a plane of symmetry refers to a structure that not more than five occlusion units comprising a core of the styrene-based polymer and a shell of the rubber-like polymer are contained in one rubber particle, and at least 50% of the particles contain only one occlusion unit and furthermore have a plane of symmetry.

In the present invention, it is necessary that at least 70% have the occlusion structure as described above. If particles having a salami structure are present in a proportion of more than 30%, there is a danger that good gloss will not be obtained.

Accordingly, in the present invention, high impact resistant polystyrene (HIPS) with the usual salami structure containing at least six occlusion units can be compounded if in a proportion as the number of rubber particles of less than 30%.

Moreover, in the present composition, it is required that rubber-like polymer particles have a specified microstructure. That is, it is required that the weight ratio of the gel content to the rubber-like polymer is in the range of 1.1:1 to 4.0:1, preferably 1.4:1 to 3.6:1, and that the swelling index is in the range of 5 to 20, preferably 7 to 18. If the weight ratio of the gel content to the rubber-like polymer is less than 1.1:1, impact resistance is not sufficiently high. If it is more than 4.0:1 ratio, there is a danger of gloss being decreased. If the swelling index is outside the above range, the impact resistance tends to decrease.

In the present composition, it is necessary that the styrene-based polymer as the component (A) and the rubber-like polymer as the component (B) are in proportions of 70 to 92% by weight and 30 to 8% by weight, respectively, and preferably 72 to 90% by weight and 28 to 10% by weight, respectively. If the content of the rubber-like polymer is less than 8% by weight, the effect of improving impact resistance is not sufficiently exhibited. If it is more than 30% by weight, gloss and fluidity tend to decrease.

In the present composition, the thickness ($\lambda$) of the rubber-like polymer phase is preferably not more than 0.10 μm. To make the thickness ($\lambda$) of the rubber-like polymer phase not less than 0.10 μm, it is necessary to increase the molecular weight of the rubber-like polymer to be used (for example, when styrene-butadiene block copolymer rubber is used, it is necessary that the molecular weight of the butadiene polymer block portion is made not less than 800,000).

If such high molecular weight rubber-like polymer is used to prepare the rubber-modified styrene-based resin composition of the present invention, the viscosity of the polymerization reaction solution is undesirably markedly increased. The thickness ($\lambda$) of the rubber-like polymer layer is preferably made 0.005 to 0.07 μm. K as calculated from the equation:

$$K = \phi_R \{1-[((D_S/2)-\lambda)/(D_S/2)]^3\}^{-1} \quad (I)$$

(where $\phi_R$ is a volume fraction of the rubber-like polymer, $D_S$ is an area average particle diameter of the rubber-like polymer, and $\lambda$ is a thickness of the rubber-like polymer phase) is at least 0.18, preferably at least 0.20 and more preferably at least 0.22. If this K value is less than 0.18, a falling weight impact strength is not sufficiently high; for example, it is not always sufficiently high as a material for a housing of large-sized television sets.

The volume fraction ($\phi_R$) of the rubber-like polymer can be calculated from the equation:

$$\phi_R = \{[(1/W_R)-1](\rho_R/\rho_{PS})+1\}^{-1} \quad (II)$$

In the equation, $\rho_R$ indicates a specific gravity of the rubber-like polymer and it is 0.90, and $\rho_{PS}$ indicates a specific gravity of the styrene based polymer and it is 1.05. $W_R$ is a weight fraction of the rubber-like polymer contained in the composition and can be calculated from the equation:

$$W_R = W_D(1-S)/[(1-W_D)X + W_D] \quad \text{(III)}$$

where x = conversion of a styrene-based monomer in polymerization,

S = styrene unit content of charged rubber-like polymer, for example, an SB block copolymer (measured by IR), $W_D$ = content of charged rubber-like polymer, for example, an SB block copolymer in a styrene-based monomer solution.

The area average particle diameter ($D_S$) and number average particle diameter ($D_n$) of the rubber-like polymer can be determined as follows. That is, pellets of rubber-modified styrene-based resin composition which is small in orientation and have been treated with a 3% by weight aqueous solution of osmium tetraoxide are sliced by the use of a super microtome and then a transmission type electron micrograph of the slice is taken. Diameters (D) in the long axis of 1,000 rubber-like polymer particles are measured and their area average value is calculated from the following equation:

$$D_s = \frac{\Sigma nD^3}{\Sigma nD^2},$$

$$D_n = \frac{\Sigma nD}{\Sigma n}$$

(where n is the number of rubber-like polymer particles having the diameter D) to thereby obtain area average particle diameters ($D_S$) and number average particle diameter ($D_n$).

The thickness ($\lambda$) of the rubber-like polymer phase is determined by obtaining a transmission type electron micrograph in the same manner as described above, measuring the thickness $\lambda_i$ of rubber-like polymer phase of 100 of rubber-like polymer particles in which the rubber-like polymer phase is present only in the boundary, i.e., rubber-like polymer particles which are cut nearly in the center thereof, and calculating a number average value from the following equation:

$$\lambda = (\lambda_1 + \lambda_2 + \lambda_3 + \ldots + \lambda_{100})/100.$$

The ratio of occlusion structure particles is evaluated by obtaining a transmission type electron micrograph in the same manner as described above, and measuring a ratio of the number of occlusion structure particles to 1,000 particles chosen at random.

The rubber-modified styrene-based resin composition of the present invention can be prepared by polymerizing styrene or styrene and a monomer copolymerizable therewith in the presence of a rubber-like polymer. This polymerization method is not critical; conventionally employed methods such as an emulsion polymerization method, a bulk polymerization method, a solution polymerization method, a suspension polymerization method, or a multi-stage polymerization method such as a bulk-suspension two stage polymerization method can be employed.

One of the suitable methods of preparing the resin composition of the present invention according to the bulk-suspension two stage polymerization method will hereinafter be explained. In the first place, a rubber-like polymer is added to styrene or a mixture of styrene and a monomer copolymerizable therewith and dissolved by heating, if necessary. This dissolution is preferably carried out as uniformly as possible.

Then, to the resulting solution, a molecular weight modifier (chain transfer agent), such as alkylmercaptan, and a polymerization initiator, such as an organic peroxide, which is to be used if necessary are added, and preliminary polymerization is carried out by a bulk polymerization method while heating at a temperature of about 70° to 150° C. and stirring until the degree of polymerization reaches 10 to 60%. At this polymerization stage, the rubber-like polymer is dispersed in a particle form by stirring.

Then, the above preliminary polymerization solution is suspended in water by the use of calcium triphosphate or polyvinyl alcohol, for example, as a suspending agent, and suspension polymerization (main polymerization) is carried out until the degree of polymerization reaches about 100%. If necessary, after the main polymerization step, heating may be continued.

The above molecular weight modifier includes, for example, α-methylstyrene dimer, mercaptans such as n-dodecylmercaptan, tert-dodecylmercaptan, 1-phenylbutene-2-fluorene, dipentene, chloroform and the like, terpenes and halogen compounds and the like.

The polymerization initiator which is to be used if necessary, includes organic peroxides, for example, peroxyketals such as 1,1-bis(tert-butylperoxy)cyclohexane and 1,1-bis(tertbutylperoxy)3,3,5-trimethylcyclohexane, dialkylperoxides such as dicumyl peroxide, di-tert-butyl peroxide, and 2,5-dimethyl-2,5-di(tert-butylperoxy)hexane, diaryl peroxides such as benzoyl peroxide and m-toluoyl peroxide, peroxy dicarbonates such as dimyristylperoxy dicarbonate, peroxy esters such as tert-butylperoxyisopropyl carbonate, ketone peroxides such as cyclohexanone peroxide, and hydroperoxides such as p-menthane hydroperoxide.

Particle diameter, particle diameter distribution and particle structure of the rubber-like polymer can be controlled by the number of stirring revolutions, the amount of a molecular weight modifier used, and so on, and gel content and swelling index can be controlled by the type and amount of the catalyst, the reaction temperature, the reaction time, and so on.

The thickness, $\lambda$, of the rubber-like polymer phase can be controlled by changing the molecular weight of the butadiene polymer block portion when styrene-butadiene block copolymer rubber, for example, is used as the rubber-like polymer. That is, if the molecular weight of the butadiene polymer block portion is decreased, $\lambda$ is decreased, and if it is increased, $\lambda$ is increased.

Then the slurry thus obtained is treated by the usual technique to obtain a bead-like reaction product. This product is taken out, dried and then pelletized to obtain a rubber-modified styrene-based resin composition of the present invention. The molecular weight of the matrix portion of the rubber-modified styrene-based resin composition thus obtained is 100,000 to 300,000 and preferably 130,000 to 280,000. If the molecular weight is less than 100,000, impact resistance is poor, and if it is more than 300,000,.fluidity at the time of molding is not sufficiently high.

To the rubber-modified styrene-based resin composition of the present invention can be added, if necessary, various additives commonly used, for example, a lubricant, e.g., stearic acid, behenic acid, zinc stearate, calcium stearate, magnesium stearate and ethylenebisstearoamide, an antioxidant, e.g., organic polysiloxane, mineral oil, or hindered phenol-based antioxidant such as 2,6-di-tertbutyl-4-methylphenol, stearyl-$\beta$-(3,5-di-tert-butyl-4-hydroxyphenyl)propionate, and triethyleneglycol bis-3-(3-tert-butyl-4-hydroxy-5-methylphenyl)propionate, or phosphorus-based antioxidant such as tri(2,4-di-tertbutylphenyl) phosphate and 4,4'-butylidene bis(3-methyl-6-tert-butylphenyl-di-tridecyl) phosphite, an ultraviolet absorbing agent, a flame retardant, an antistatic agent, a releasing agent, a plasticizer, a dye, a pigment, and various fillers. In addition, other polymers such as polyphenylene ether can be compounded.

The styrene-based resin composition of the present invention is excellent in the balance of physical properties such as impact resistance, gloss and stiffness, and thus is suitable as a material for production of OA equipments, home electric appliances, sheets and so on.

EXAMPLE

The present invention is described in greater detail with reference to the following examples, although it is not intended to be limited thereto.

Physical properties of moldings and characteristics of compositions were measured by the following methods.

(1) Gel Content, Swelling Index

Sample Wc (g) is dissolved in toluene and is subjected to centrifugal separation at 15,000 rpm for 60 minutes. The supernatant is subjected to decantation, and the weight Ws (g) of swollen insoluble portion is measured. This swollen insoluble portion is vacuum dried at 60° C. for 24 hours, and the weight Wg (g) of dried insoluble portion is measured.

Gel content (wt %) = (Wg/Wc) × 100
Swelling index = Ws/Wg

(2) Izod Impact Resistance

Measured according to JIS K-7110 (23° C., notched).

(3) Gloss

Measured according to JIS K-7105.

(4) Flexural Modulus

Measured according to ASTM D-790.

(5) Melt Index (MI)

Measured according to JSO R-1133.

(6) Falling Weight Impact Strength

The energy until an abrupt decrease in force is first observed in a force-displacement curve is determined by the use of a Rheometrics automatic falling weight impact tester RDT 5000 at a point 125 mm from a gate position of a 270×70×3 mm injection molded plate and at the center of the plate width (700 mm) under conditions of load 3.76 kg, speed 3.5 m/sec, pore diameter of the specimen fixed point 2 inch, and temperature 23° C., and is indicated as a falling weight impact strength.

EXAMPLE 1

362 g of an SB block copolymer having a weight average molecular weight of 330,000 and a styrene unit content of 30% by weight, 3,000 g of styrene and 1 g of n-dodecylmercaptan as a chain transfer agent were placed in a 5-liter autoclave, and reacted at 130° C. for 4 hours while stirring at 400 rpm.

Then, 3,000 g of the above reaction mixture, 3000 g of water, 10 g of polyvinyl alcohol as a suspension stabilizer, 6 g of benzoyl peroxide and 3 g of dicumyl peroxide as a polymerization initiator were placed in a 10-liter autoclave and raised in temperature from 80° C. to 140° C. at a temperature raising speed of 30° C./hr while stirring at 300 rpm. At this temperature, they were reacted for 4 hours while stirring at 300 rpm to obtain beads of a rubber-modified polystyrene composition.

The composition beads thus obtained were pelletized by the use of a single screw extruder at 220° C. and then molded.

The results of measurement of physical properties of the molding obtained, and characteristics of the composition are shown in Table 1.

EXAMPLE 2

The procedure of Example 1 was repeated with the exception that the amount of the SB blook copolymer charged was changed to 448 g and the number of revolutions in bulk polymerization was changed to 500 rpm. The results are shown in Table 1.

EXAMPLE 3

The procedure of Example 1 was repeated with the exception that as the SB block copolymer, 319 g of a copolymer having a molecular weight of 200,000 and a styrene unit content of 30% by weight was used, and the number of revolutions in bulk polymerization was changed to 500 rpm. The results are shown in Table 1.

EXAMPLE 4

The procedure of Example 1 was repeated with the exception that the amount of the SB block copolymer charged was changed to 377 g and the number of revolutions in bulk polymerization was changed to 300 rpm. The results are shown in Table 1.

EXAMPLE 5

The procedure of Example 1 was repeated with the exception that the amount of the SB block copolymer charged was changed to 636 g. The results are shown in Table 1.

EXAMPLE 6

The procedure of Example 1 was repeated with the exception that as the SB block copolymer, 659 g of an SB block copolymer (molecular weight: 100,000; styrene unit content: 22.6 wt %; trade name: ZLS-01; produced by Nippon Zeon Co., Ltd.) was used, and the number of revolutions in bulk polymerization was changed to 300 rpm. The results are shown in Table 1.

EXAMPLE 7

The procedure of example 6 was repeated with the exception that the amount of the SB block copolymer charged was changed to 1,167 g. The results are shown in Table 1.

EXAMPLE 8

The procedure of example 6 was repeated with the exception that the amount of the SB block copolymer charged was changed to 333 g. The results are shown in Table 1.

EXAMPLE 9

The procedure of example 6 was repeated with the exception that the amount of dicumyl peroxide compounded was changed to 10 g. The results are shown in Table 1.

EXAMPLE 10

The procedure of Example 6 was repeated with the exception that the amount of dicumyl peroxide compounded was changed to 2 g. The results are shown in Table 1.

EXAMPLE 11

The procedure of Example 6 was repeated with the exception that the number of revolutions in bulk polymerization was changed to 500 rpm. The results are shown in Table 1.

EXAMPLE 12

To the rubber-modified polystyrene composition beads obtained in Example 6 was compounded 0.2% by weight of polydimethylsiloxane, and the resulting mixture was pelletized by the use of a single screw extruder at 220° C. and then molded.

The results of measurement of physical properties of the molding obtained and characteristics of the composition are shown in Table 1.

EXAMPLE 13

The procedure of Example 3 was repeated with the exception that the amount of the SB block copolymer charged was changed to 527 g and the number of revolutions in bulk polymerization was changed to 400 rpm. The results are shown in Table 1.

EXAMPLE 14

The procedure of Example 13 was changed with the exception that the number of revolutions in bulk polymerization was changed to 500 rpm. The results are shown in Table 1.

EXAMPLE 15

The procedure of Example 1 was repeated with the exception that as the SB block copolymer, 752 g of a copolymer having a molecular weight of 100,000 and a styrene unit content of 30% by weight was used, and the number of revolutions in bulk polymerization was changed to 500 rpm. The results are shown in Table 1.

EXAMPLE 16

The procedure of Example 4 was repeated with the exception that to 377 g of the SB block copolymer was further compounded 94 g of polybutadiene (produced by Ube Kosan Co., Ltd.; trade name: BR 15HB; molecular weight: 550,000). The results are shown in Table 1.

EXAMPLE 17

The procedure of Example 16 was repeated with the exception that the amount of the polybutadiene added was changed to 162 g. The results are shown in Table 1.

EXAMPLE 18

704 g of an SB block copolymer (produced by Nippon Zeon Co., Ltd.; trade name: ZLS-01; styrene unit content: 22.6% by weight; molecular weight: 100,000), 3,000 g of styrene and 1 g of n-dodecylmercaptan as a chain transfer agent were placed in a 5-liter autoclave, and reacted with stirring at 300 rpm, at 130° C. for 4 hours to obtain a preliminary polymer (I).

Similarly, a preliminary polymer (II) was obtained using 409 g of polybutadiene (produced by Asahi Kasei Co., Ltd.; trade name: NF35AS) and 0.5 g of n-dodecylmercaptan. (In connection with rubber structure, beads were synthesized under suspension polymerization conditions as shown below and in each, 0.4 μm of occlusion and 1.2 μm of a salami structure were confirmed under an electron microscope.) Then, 2,550 g of the preliminary polymer (I), 450 g of the preliminary polymer (II), 3,000 g of water, 10 g of polyvinyl alcohol as a suspension stabilizer, 6 g of benzoyl peroxide and 3 g of dicumyl peroxide as a polymerization initiator were palced in a 10-liter autoclave, and raised in temperature from 80° C. to 140° C. at a temperature raising speed of 30° C./hr and further reacted for 4 hours while stirring at 500 rpm to obtain beads of rubber-modified polystyrene. (It was confirmed by an electron microscope that occlusion was 0.4 μm and salami is 1.2 μm.) The beads thus obtained were pelletized by the use of a single screw extruder at 220° C. and then molded.

The results of measurement of physical properties of the molding obtained and characteristics of the composition are shown in Table 1.

EXAMPLE 19

The procedure of Example 18 was repeated with the exception that the amount of n-dodecylmercaptan used in preparing the preliminary polymer (II) was changed to 1 g. The results are shown in Table 1.

TABLE 1

| | Rubber Content (wt %) | Rubber Volume Fraction $\phi_R$ | Thickness of Rubber Phase $\lambda(\mu m)$ | Area Average Particle Diameter of Rubber $D_s$ ($\mu m$) | $D_s/D_n$ | Gel/Rubber (weight ratio) | Swelling Index | K | Ratio of Particles with Occlusion Structure | Gloss (%) | Izod Impact Strength (kg·cm/cm) | Falling Weight Impact Strength (J) | Flexural Modulus (kg/cm) | MI (g/10 min) |
|---|---|---|---|---|---|---|---|---|---|---|---|---|---|---|
| Example 1 | 10.8 | 0.10 | 0.034 | 0.26 | 1.5 | 1.6 | 13 | 0.17 | 90 | 99 | 11.1 | 0.8 | 23800 | 3.6 |
| Example 2 | 13.0 | 0.12 | 0.034 | 0.20 | 1.4 | 1.8 | 12 | 0.17 | 93 | 98 | 10.0 | 0.5 | 23400 | 3.8 |
| Example 3 | 9.6 | 0.09 | 0.022 | 0.20 | 1.3 | 2.2 | 12 | 0.17 | 97 | 99 | 9.8 | 0.2 | 24100 | 4.3 |
| Example 4 | 11.2 | 0.09 | 0.034 | 0.32 | 1.7 | 3.0 | 12 | 0.18 | 92 | 98 | 9.6 | 4 | 23700 | 4.2 |
| Example 5 | 17.5 | 0.14 | 0.034 | 0.26 | 1.4 | 2.6 | 11 | 0.23 | 96 | 100 | 11.3 | 6 | 23400 | 3.3 |
| Example 6 | 18 | 0.159 | 0.023 | 0.36 | 1.3 | 2.4 | 12 | 0.473 | 93 | 95 | 12.6 | 11 | 23100 | 3.2 |
| Example 7 | 28 | 0.244 | 0.023 | 0.26 | 1.6 | 1.6 | 13 | 0.552 | 92 | 93 | 14.1 | 10 | 21800 | 2.0 |
| Example 8 | 10 | 0.083 | 0.023 | 0.64 | 1.2 | 3.6 | 11 | 0.414 | 84 | 96 | 10.0 | 12 | 23500 | 4.0 |

TABLE 1-continued

| | Rubber Content (wt %) | Rubber Volume Fraction $\phi_R$ | Thickness of Rubber Phase $\lambda(\mu m)$ | Area Average Particle Diameter of Rubber $D_s$ ($\mu m$) | $D_s/D_n$ | Gel/Rubber (weight ratio) | Swelling Index | K | Ratio of Particles with Occlusion Structure | Gloss (%) | Izod Impact Strength (kg·cm/cm) | Falling Weight Impact Strength (J) | Flexural Modulus (kg/cm) | MI (g/10 min) |
|---|---|---|---|---|---|---|---|---|---|---|---|---|---|---|
| Example 9 | 18 | 0.159 | 0.023 | 0.36 | 1.3 | 1.9 | 7 | 0.473 | 93 | 95 | 11.3 | 10 | 22800 | 3.0 |
| Example 10 | 18 | 0.159 | 0.023 | 0.36 | 1.2 | 2.0 | 18 | 0.473 | 92 | 94 | 10.9 | 8 | 23000 | 2.9 |
| Example 11 | 18 | 0.159 | 0.023 | 0.16 | 1.1 | 2.6 | 9 | 0.249 | 95 | 96 | 10.8 | 5 | 23500 | 3.0 |
| Example 12 | 0.2 wt % of polydimethylsiloxane was compounded to the one of Example 6. | | | | | | | | | 96 | 15.1 | 11 | 23200 | 3.5 |
| Example 13 | 14.9 | 0.12 | 0.022 | 0.28 | 1.5 | 2.0 | 13 | 0.30 | 95 | 99 | 12.4 | 11 | 22700 | 2.7 |
| Example 14 | 14.9 | 0.12 | 0.022 | 0.20 | 1.6 | 1.8 | 14 | 0.23 | 96 | 100 | 10.5 | 6 | 22900 | 3.0 |
| Example 15 | 20.0 | 0.16 | 0.014 | 0.16 | 1.4 | 1.6 | 15 | 0.36 | 93 | 101 | 9.9 | 8 | 23000 | 3.4 |
| Example 16 | 13.6 | 0.12 | 0.040 | 0.48 | 2.0 | 2.3 | 13 | 0.28 | 83 | 94 | 12.6 | 5 | 23100 | 3.0 |
| Example 17 | 15.2 | 0.14 | 0.043 | 0.66 | 2.4 | 2.1 | 14 | 0.40 | 74 | 92 | 14.8 | 9 | 22700 | 2.6 |
| Example 18 | 18 | 0.16 | 0.023 | 0.43 | 1.8 | 2.6 | 12 | 0.57 | 83 | 95 | 13.4 | 11 | 23000 | 2.5 |
| Example 19 | 18 | 0.16 | 0.023 | 0.68 | 2.2 | 2.5 | 13 | 0.86 | 87 | 94 | 14.6 | 14 | 22200 | 2.8 |

COMPARATIVE EXAMPLE 1

The procedure of Example 3 was repeated with the exception that the amount of the SB block copolymer charged was changed to 205 g and the number of revolutions in bulk polymerization was changed to 400 rpm. The results are shown in Table 2.

COMPARATIVE EXAMPLE 2

The procedure of Example 15 was repeated with the exception that the amount of the SB block copolymer charged was changed to 242 g. The results are shown in Table 2.

COMPARATIVE EXAMPLE 3

The procedure of Example 6 was repeated with the exception that the amount of the SB block copolymer charged was changed to 191 g. The results are shown in Table 2.

COMPARATIVE EXAMPLE 4

The procedure of Example 6 was repeated with the exception that the amount of the SB block copolymer charged was changed to 1.477 g. the results are shown in Table 2.

COMPARATIVE EXAMPLE 5

The procedure of Example 6 was repeated with the exception that the amount of the dicumyl peroxide compounded as a polymerization initiator was changed to 0.5 g. The results are shown in Table 6.

COMPARATIVE EXAMPLE 6

The procedure of Example 6 was repeated with the exception that 6 g of di-tert-butyl peroxide was used in place of 6 g of benzoyl peroxide and the amount of dicumyl peroxide compounded was changed to 10 g. The results are shown in Table 2.

COMPARATIVE EXAMPLE 7

The procedure of Example 6 was repeated with the exception that the number of revolutions in bulk polymerization was changed to 800 rpm. The results are shown in Table 2.

COMPARATIVE EXAMPLE 8

The procedure of Example 6 was repeated with the exception that the number of revolutions in bulk polymerization was changed to 100 rpm. The results are shown in Table 2.

COMPARATIVE EXAMPLE 9

The procedure of Example 17 was repeated with the exception that the amount of the polybutadiene compounded was changed to 262 g. The results are shown in Table 2.

TABLE 2

| | Rubber Content (wt %) | Rubber Volume Fraction $\phi_R$ | Thickness of Rubber Phase $\lambda(\mu m)$ | Area Average Particle Diameter of Rubber $D_s$ ($\mu m$) | $D_s/D_n$ | Gel/Rubber (weight ratio) | Swelling Index | K | Ratio of Particles with Occlusion Structure | Gloss (%) | Izod Impact Strength (kg·cm/cm) | Falling Weight Impact Strength (J) | Flexural Modulus (kg/cm) | MI (g/10 min) |
|---|---|---|---|---|---|---|---|---|---|---|---|---|---|---|
| Comparative Exam- | 6.4 | 0.06 | 0.022 | 0.28 | 1.1 | 2.8 | 13 | 0.14 | 94 | 98 | 3.3 | 0.1 | 24800 | 3.4 |

TABLE 2-continued

| | Rubber Content (wt %) | Rubber Volume Fraction $\phi_R$ | Thickness of Rubber Phase $\lambda(\mu m)$ | Area Average Particle Diameter of Rubber $D_s$ ($\mu m$) | $D_s/D_n$ | Gel/Rubber (weight ratio) | Swelling Index | K | Ratio of Particles with Occlusion Structure | Gloss (%) | Izod Impact Strength (kg·cm/cm) | Falling Weight Impact Strength (J) | Flexural Modulus (kg/cm) | MI (g/10 min) |
|---|---|---|---|---|---|---|---|---|---|---|---|---|---|---|
| ple 1 Comparative Example 2 | 7.5 | 0.07 | 0.014 | 0.36 | 1.2 | 3.1 | 12 | 0.16 | 91 | 94 | 4.2 | 0.1 | 24600 | 3.0 |
| Comparative Example 3 | 6 | 0.054 | 0.023 | 0.48 | 1.1 | 4.2 | 11 | 0.21 | 89 | 89 | 6.8 | 3 | 24200 | 3.5 |
| Comparative Example 4 | 33 | 0.286 | 0.023 | 0.42 | 1.5 | 1.4 | 14 | 0.97 | 90 | Molding is impossible because of poor fluidity. | | | | |
| Comparative Example 5 | 18 | 0.159 | 0.023 | 0.27 | 1.4 | 1.0 | 22 | 0.37 | 94 | 93 | 5.0 | 3 | 23500 | 4.8 |
| Comparative Example 6 | 18 | 0.159 | 0.023 | 0.41 | 1.5 | 3.2 | 4 | 0.53 | 92 | 95 | 5.9 | 5 | 24000 | 2.3 |
| Comparative Example 7 | 18 | 0.159 | 0.023 | 0.09 | 1.1 | 2.8 | 16 | 0.18 | 95 | 98 | 5.1 | 3 | 23300 | 3.9 |
| Comparative Example 8 | 18 | 0.159 | 0.023 | 0.84 | 1.5 | 2.5 | 12 | 1.02 | 73 | 86 | 12.4 | 12 | 21800 | 3.6 |
| Comparative Example 9 | 17.6 | 0.165 | 0.047 | 0.89 | 2.7 | 2.8 | 14 | 0.58 | 66 | 85 | 14.4 | 7 | 20100 | 3.1 |

INDUSTRIAL APPLICABILITY

The rubber-modified styrene-based resin composition of the present invention is excellent in the balance of physical properties and can be effectively utilized as a material for OA equipments, home electric appliances, sheets and so forth.

We claim:

1. A rubber-modified styrene-based resin composition comprising (A) 70 to 92% by weight of a styrene-based polymer, the styrene-based polymer being a styrene homopolymer or a copolymer of styrene and an ethylenically unsaturated copolymerizable monomer and (B) 30 to 8% by weight of a rubbery polymer, wherein said rubbery polymer is dispersed in said styrene-based polymer in the form of particles having an occlusion structure with a plane of symmetry, an area average particle diameter of 0.1 to 0.7 μm, and a ratio of area average particle diameter to number average particle diameter of 0.1 to 2.5, the composition having a gel content wherein the weight ratio of the gel content to the rubbery polymer is 1.1:1 to 4.0:1, and the composition having a swelling index in toluene of 5 to 20.

2. The composition as claimed in claim 1, wherein the composition having a rubber polymer phase having a thickness of not more than 0.10 μm, the dispersed rubbery polymer particles occupying a volume fraction in the composition and have a value K of at least 0.18 as calculated from the following equation:

$$K = \phi_R \{1-(((D_S/2)-\lambda)/(D_S/2))^3\}^{-1}$$

wherein $\phi_R$ is the volume fraction of the rubbery polymer in the composition, $D_S$ is the area average particle diameter of the rubber polymer, and $\lambda$ is the thickness of the rubbery polymer phase.

3. The composition as claimed in claim 1, wherein the styrene-based polymer is a copolymer of styrene and a monomer selected from the group consisting of α-methylstyrene, vinyltoluene, vinylethylbenzene, vinylxylene, p-tert-butylstyrene, α-methyl-p-methylstyrene, vinylnaphthalene, acrylonitrile, methyl methacrylate, methyl acrylate, methacrylic acid, acrylic acid, maleic anhydride and phenylmaleimide.

4. The composition as claimed in claim 2, wherein the rubbery polymer is selected from the group consisting of natural rubber, polybutadiene rubber, polyisoprene rubber, styrene-butadiene copolymer rubber, styreneisoprene copolymer rubber, butyl rubber and ethylene-propylene based copolymer rubber.

5. The composition as claimed in claim 2, wherein the rubbery polymer comprises a styrene-butadiene block copolymer having a molecular weight of 50,000 to 500,000 with 10 to 60% of the polymer block being formed of styrene.

6. The composition as claimed in claim 4, wherein the area average particle diameter is 0.2 to 0.6 μm, the ratio of the area average particle diameter to the number average particle diameter is 1 to 1.8, the weight ratio of the gel content to the rubbery polymer is 1.4:1 to 3.6:1 and the swelling index is 7 to 18.

7. The composition as claimed in claim 7, wherein the styrene-based polymer is in an amount of 72 to 90% by weight and the rubbery polymer is in an amount of 28 to 10% by weight.

8. The composition as claimed in claim 7, wherein the thickness of the rubbery polymer phase is 0.005 to 0.07 μm.

9. The composition as claimed in claim 8, wherein K is 0.20.

10. The composition as claimed in claim 8, wherein K is 0.22.

11. The composition as claimed in claim 1, wherein at least 70% of the particle have an occlusion structure with a plane of symmetry.

* * * * *

UNITED STATES PATENT AND TRADEMARK OFFICE
CERTIFICATE OF CORRECTION

PATENT NO. : 5,231,142
DATED : July 27, 1993
INVENTOR(S) : TSUBOKURA et al It is certified that error appears in the above-identified patent and that said Letters Patent is hereby corrected as shown below:

```
Column 13, line 62 (Claim 1):
              Replace "0.1" with --1.0--.

Column 15, line 12 (Claim 7):
              Replace "claim 7" with --claim 6--.
```

Signed and Sealed this

Twenty-sixth Day of July, 1994

Attest:

BRUCE LEHMAN

*Attesting Officer*         Commissioner of Patents and Trademarks